United States Patent Office 2,885,407
Patented May 5, 1959

2,885,407
SYNTHESIS OF SESAMOL ACETATE AND SESAMOL

James E. Hardwicke, Ridgewood, and Jerome King, North Arlington, N.J., and Ross Clark Terrell, New York, N.Y., assignors to Shulton, Inc., Clifton, N.J., a corporation of New Jersey No Drawing. Application February 27, 1957
Serial No. 642,661

4 Claims. (Cl. 260—340.5)

This invention relates to the synthesis of sesamol acetate and sesamol and more particularly to a novel process of synthesizing sesamol from piperonal.

Acetals, ethers and other derivatives of sesamol are excellent synergists for pyrethrins. An outstanding synergist for pyrethrins is Sesoxane, which is the acetal obtained by reacting sesamol with vinyl ethyl carbitol. Sesamol is, therefore, an important intermediate employed in the production of pyrethrin synergists.

Heretofore, sesamol has been prepared by reacting piperonal with anhydrous peracetic acid ($CH_3COOOH$) in the presence of large amounts of acetic acid (approximately 5 to 6 parts of acetic acid per part of piperonal) and a catalytic amount of a catalyst, such as p-toluenesulfonic acid at temperatures of 25° to 35° C. for relatively long periods of time, e.g., about 22 hours. The resulting sesamol acetate was converted to sesamol by saponification with potassium hydroxide in methanol and acidification of the potassium salt with acetic acid. A yield not exceeding about 60% sesamol was thus obtained. The reaction residue from which the sesamol acetate was distilled off was invariably so viscous that it could not be removed readily from the reaction vessel and, hence, presented a serious handling problem.

Large amounts of acetic acid solvent for the peracetic acid and cooling of the exothermic reaction to low reaction temperatures, of the order of 25–35° C., were used to minimize the formation of peroxides, such as acetyl peroxides during the course of the reaction. As is well known, such peroxides are extremely unstable and any substantial accumulation thereof in the reaction mixture results in an explosion hazard.

It is among the objects of the present invention to provide an improved process for the production of sesamol acetate (which can be decomposed to produce sesamol) from piperonal, which process requires less reaction time, is safe and results in higher yields.

Still another object of the present invention is to provide a process of producing sesamol acetate or sesamol, which process does not involve the production of viscous distillation residues which present a difficult handling or disposal problem.

Still another object of the present invention is to provide an improved procedure of effecting the alcoholysis of the sesamol acetate to produce high yields of sesamol.

Other objects and advantages of this invention will be apparent from the following detailed description thereof.

Contrary to the general conception and belief of those familiar with the production of sesamol from piperonal, we have made the surprising and unexpected discovery that piperonal can be reacted safely with anhydrous peracetic acid at temperatures of 50°–70° C. in the absence of added acetic acid or other solvent or diluent for the peracetic acid, but in the presence of an acid catalyst such as p-toluenesulfonic acid, or phosphoric acid. Such catalysts are added to the reaction mixture in catalytic amounts, e.g., in amounts of from 0.1 to 5.0% by weight, preferably from 0.5 to 2.0% by weight based on the weight of peracetic acid present in the reaction mixture. Under the above noted conditions, the reaction of sesamol to sesamol acetate (the sesamol formate formed is converted to sesamol acetate by the acetic acid present in the peracetic acid used) is carried to completion in from 2 to 4 hours.

In accordance with a preferred embodiment of this invention, the crude sesamol acetate containing tarry by-products of the oxidation reaction is partially purified by precipitating the tars from the reaction mixture, employing for this purpose a non-polar solvent for the sesamol acetate. Suitable solvents are benzene, toluene, xylene, ethylene dichloride, and carbon tetrachloride. The amount of solvent used is not critical as long as it is sufficient to dissolve all of the sesamol acetate present in the reaction mixture. Large excesses above this amount should be avoided since such excesses serve no useful purposes and entail the needless handling of excess solvent. The precipitated tars can readily be separated from the sesamol solution, for example, by filtration.

The sesamol acetate solution may readily be converted to sesamol by saponification with an equivalent amount of potassium hydroxide in methanol and liberating it from its potassium salt by treatment with acetic acid. Instead of such known procedures involving the use of at least a stoichiometric amount of alkali followed by treatment with enough acid to neutralize all base present, we have found that the alcoholysis of the sesamol acetate may be effected in the presence of a catalytic amount of alkali. Thus the solution of sesamol acetate may be refluxed with a catalytic amount of alkali in methanol or other lower alcohol, such as ethanol, propanol, benzyl alcohol or other aryl carbinol. Alternatively an alcoholic solution of sesamol acetate may be passed over a bed of alkaline material to catalyze the alcoholysis reaction.

The alcohol employed in effecting the alcoholysis of the sesamol acetate, desirably is one having not more than 7 carbon atoms. Methanol is preferred because it forms methyl acetate in the reaction with sesamol acetate; methyl acetate boils lower than the methyl alcohol and can be readily stripped out of the reaction mixture causing the reaction to go to completion with quantitative yields of sesamol.

When the alcoholysis of the sesamol acetate is carried out by refluxing the mixture of sesamol acetate, alcohol and alkali catalyst, only a small amount of dissolved alkali catalyst is necessary to catalyze the reaction. As little as 0.002% by weight based on the weight of sesamol acetate gives reasonably good results. It is preferred however to use somewhat larger amounts of catalyst of the order of about 0.10% based on the weight of the sesamol acetate. In general from 0.002% to about 1% based on the weight of the sesamol acetate can be used. Larger amounts of alkali catalyst than 1% may be used. However when such larger amounts are used it is necessary to acidify the reaction mixture to convert the alkali salt of sesamol formed by reaction of alkali with sesamol, to recover sesamol. Accordingly use of such larger amounts of alkali catalyst involves a waste of both alkali and acid and is not recommended. When using very small amounts of alkali of the order of about 0.1% or less based on the weight of the sesamol acetate, it is not necessary to employ acid to neutralize the alkali because the sesamol which distills over after the alcohol has been removed by distillation is pure and the amount of sesamol lost due to the formation of the alkali salt is negligible. Use of a relatively small amount of alkali will of course require only a small amount of acid to neutralize any alkali which may be in the reaction mixture and to convert the small amount of alkali sesamol salt formed to sesamol.

The particular alkali employed as the catalyst is not critical; sodium or potassium hydroxide, ammonia, sodium or potassium methoxide, sodium or potassium stearate and trisodium phosphate give good results. Other alkalis can of course be used.

Instead of effecting the alcoholysis of the sesamol acetate by refluxing with the alcohol in the presence of a soluble alkali catalyst, the alcoholysis may be carried out by flowing the sesamol acetate-alcohol solution over or through a bed of alkali-containing material such for example as tri-sodium phosphate or anion exchange resins (synthetic resin amines). When employing a bed containing alkali over which the sesamol acetate alcohol solution is passed, the larger the bed the faster the rate of flow which can be used and still obtain a reasonably good yield of sesamol. The rate of flow should be chosen, taking into account the nature of the alkali material of the bed and the size of the bed as to give the desired yield. This can readily be determined by trial.

Pure sesamol, free of piperonal, in relatively high yields, of the order of 70% to 80% is thus obtained.

As the piperonal employed, piperonal of commerce may be used. Crude piperonal obtained by the flash distillation of the oxidation of isosafrol with chromic acid can be used with an economy in the process due to the saving effected in eliminating the expense involved in purifying the crude piperonal.

The peracetic acid used desirably is the commercial product containing 40% peracetic acid; it is made by reacting hydrogen peroxide with glacial acetic acid. Acetic anhydride is added thereto in amounts to make the mixture anhydrous. The amount of anhydrous peracetic acid used is the stoichiometric amount required to react with all of the piperonal present. A small excess of the order of a few percent over and above this amount may be used.

The reaction between the piperonal and peracetic acid is exothermic. In accordance with this invention, it is carried out in a reactor equipped with external cooling means, e.g., a water-jacketed reactor through which water may be circulated to remove heat. Cooling of the reactor is controlled to maintain the temperature during the reaction within the range of 50°–70° C.

As a precautionary measure, the reaction mixture should be tested at the conclusion of the reaction to determine whether peroxides are present. For example a drop of the reaction mixture may be added to a starch-potassium iodide solution; the formation of a blue or brown color indicates the presence of peroxides. Peroxides, if present, become concentrated during the distillation of the sesamol acetate to produce sesamol; such concentration of peroxides may result in an explosive reaction with organic matter present in the reaction mixture. Hence it is important to make sure that no peroxides are present before the reaction mixture resulting from the treatment of piperonal with the anhydrous peracetic acid is distilled. A small amount of sodium sulphite may be added to the reaction mixture before subjecting it to distillation to make sure that any peroxides which may be present are destroyed.

The following examples are given for purposes of illustrating preferred embodiments of the invention. It will be understood this invention is not limited to these examples. In these examples all parts and percentages are on a weight basis.

*Example I*

347.1 parts of anhydrous peracetic acid (prepared from 187.2 parts of a commercial 40% peracetic acid by the addition of 154.7 parts acetic anhydride thereto) was mixed with 3.3 parts of sodium acetate, and to the mixture was added 1.9 parts of p-toluenesulfonic acid. The resultant solution was added, while stirring, to 150 parts of piperonal over a one-hour interval; the temperature of the mixture was maintained at 50°–60° C. by circulating tap water over the exterior of the reaction vessel. After the addition of all of the peracetic acid, the reaction temperature was maintained at 50°–60° C. for an additional three hours by applying external heat whenever required. At the end of this time, a negative test for peroxides was obtained. As a precautionary measure a small amount of sodium sulfite was added to destroy any undetected peroxides.

Acetic acid was then distilled off under a pressure of approximately 25 mm. of mercury. 400 parts of benzene was added to the reaction mixture to precipitate oxidation by-products. The solids precipitated in this manner were removed by filtration. The filtrate was subjected to distillation to drive off the benzene. The remaining crude sesamol acetate was distilled, producing 126.4 parts of sesamol acetate and 10 parts of residue. The yield of sesamol acetate based on the piperonal treated was 70.2%.

Decomposition of the sesamol acetate by refluxing one hour with 0.3 parts of sodium hydroxide in 120 parts of methanol gave on distillation a quantitative yield of sesamol. The sesamol thus obtained distilled at 120°–126° C. under 5.0 mm. of mercury pressure and had a melting point of 62°–64° C.

*Example II*

This example is substantially the same as Example I up to and including the addition of the benzene to precipitate the tarry by-product produced in the oxidation reaction. In this example the benzene solution of sesamol acetate separated from the tarry by-products by filtration was treated with 0.2 part of sodium methoxide in 120 parts of methyl alcohol. The resultant mixture was refluxed one hour, during which time the methyl acetate was distilled out as formed. After removal of the methyl alcohol, 102.4 parts of sesamol were distilled over. Thus, a sesamol yield of 74.4% based on the piperonal treated was obtained.

*Example III*

In this example the anhydrous peracetic acid used was prepared in the same manner and quantity as in Example I; i.e., by treating commercial 40% peracetic acid with acetic anhydride, and sufficient sodium acetate to neutralize the sulfuric acid present (sulfuric acid is commonly employed as the catalyst in making peracetic acid by reacting hydrogen peroxide with glacial acetic acid and is usually left in the commercial product) and then re-acidifying by adding 1.9 parts of p-toluenesulfonic acid. This anhydrous peracetic acid containing p-toluenesulfonic acid was added, while stirring over a one-hour interval, 150 parts of crude piperonal containing 72% piperonal and 28% isosafrol and other impurities. The reaction temperature was maintained at 50°–60° C. during the addition of the crude piperonal by cooling the reaction vessel when necessary. After holding the reaction mixture at a temperature within the range of 50°–60° C. for an additional three hours, a negative test for peroxides was obtained. Conversion of sesamol acetate to sesamol, as in Example II, gave 78.2 parts of pure sesamol. Thus, a yield of 78.8% of sesamol was obtained based on the piperonal reacted.

*Example IV*

This example differs from the preceding examples chiefly in that instead of p-toluenesulfonic acid, phosphoric acid was employed as the catalyst. In this example, the anhydrous peracetic acid was prepared from 187.2 parts of commercial 40% peracetic acid mixed with 154.7 parts acetic anhydride, then with 3.3 parts of sodium acetate and the resultant mixture then mixed with 1.9 parts of phosphoric acid. The resultant solution was added over a one-half hour period, while stirring, to 150 parts of piperonal while maintaining the reaction temperature at 60° to 70° C. by cooling when necessary. After permitting the reaction mixture to stand for an additional 1¾ hours at 60°–70° C. a negative test for peroxides was obtained.

The reaction mixture was then distilled to drive off the acetic acid and to the residue was added 400 parts of benzene to precipitate tarry by-products. The filtrate was stripped of benzene by distillation and the crude sesamol acetate converted to sesamol by refluxing one hour with 0.3 part of sodium hydroxide in 120 parts of methyl alcohol. Upon distillation, there was obtained 108.2 parts of sesamol and 11 parts of residue. The sesamol yield was 78.6% based on the amount of piperonal treated.

*Example V*

This example differs from the preceding example in that the sesamol acetate was converted to sesamol by passing the sesamol acetate mixed with an equal quantity of methyl alcohol through a bed of trisodium phosphate at room temperature; the resultant mixture was then distilled to effect the removal of the methyl alcohol and methyl acetate. A quantitative yield of sesamol was thus obtained.

*Example VI*

In this example, 40 parts of sesamol acetate was refluxed for 1½ hours with 50 parts of methyl alcohol containing 0.2 part of sodium stearate. Methyl acetate was distilled over as formed. Distillation of the reaction mixture first at atmospheric pressure to remove methyl alcohol and then at reduced pressure of about 5 mm. of mercury gave a quantitative yield of sesamol (30.6 parts).

*Example VII*

In this example, 30 parts of sesamol acetate prepared as in Example I was refluxed two hours in admixture with 40 parts of methyl alcohol containing 0.2 part of trisodium phosphate. Methyl acetate was distilled over as formed. Distillation of the reaction mixture gave after removal of the methyl alcohol a quantitative yield of sesamol (22 parts).

*Example VIII*

In this example 36 parts of sesamol acetate was refluxed 1½ hours with 74 parts of n-butyl alcohol containing .036 part of sodium hydroxide. Distillation of this reaction mixture first at atmospheric pressure and then at 1.3 mm. of mercury gave a 91% yield of sesamol (24.9 parts).

*Example IX*

In this example 36 parts of sesamol acetate was converted to sesamol by refluxing 1½ hours with 60 parts isopropanol and .036 part of sodium hydroxide. The yield was quantitative.

*Example X*

This example differs from the preceding example in that 32 parts of methyl alcohol was used instead of 60 parts of isopropanol. A 93% yield of sesamol was obtained.

*Example XI*

In this example 36 parts of sesamol acetate was refluxed 1½ hours with 32 parts of methanol containing .036 part of calcium oxide. A 90% yield of sesamol was obtained (24.5 parts).

*Example XII*

In this example a mixture of 36 parts of sesamol acetate and 32 parts of methanol and passed through a column of an anion exchange resin (Amberlite IR-4B, a synthetic resin amine) 9 inches high and ⅝ inch in diameter for a period of 10 minutes. On distillation of the reaction mixture an 80.5% yield of sesamol was obtained (22.2 parts).

*Example XIII*

In this example commercial aqueous ammonia (28% NH₃) was employed as the catalyst for the alcoholysis reaction. 36 parts of sesamol acetate was refluxed with 32 parts of methanol containing 3 parts of aqueous ammonia. Distillation of this reaction mixture resulted in a 50% yield of sesamol (13.8 parts).

*Example XIV*

In this example 36 parts sesamol acetate was refluxed with 46 parts of ethanol containing .036 part of sodium hydroxide for 1½ hours. Distillation of the reaction mixture resulted in an 89% yield of sesamol.

*Example XV*

Sesamol acetate (18 parts) was refluxed with 32 parts of methanol containing .0036 parts of sodium hydroxide. Distillation of the reaction mixture resulted in a 50% yield of sesamol.

*Example XVI*

36 parts of sesamol acetate was refluxed with 22 parts of benzyl alcohol and .036 part of sodium methoxide. Distillation gave after the removal of the benzyl acetate 21 parts (77%) of sesamol.

It will be noted the present invention provides an improved process for producing sesamol acetate and sesamol from piperonal, which process requires less reaction time than prior known procedures, is safe, and results in higher yields. Moreover, the process effects an important economy in that it eliminates the necessity of using large amounts of acetic acid solvent for the peracetic acid employed in prior known procedures. Furthermore, the preferred embodiment of the present invention synthesizes sesamol from piperonal without producing viscous distillation residues presenting a difficult handling or disposal problem. Moreover the present invention provides a simple, economical and efficient method of effecting the alcoholysis of the sesamol acetate.

It will be understood this invention is not to be restricted to the present disclosure except as defined by the appended claims.

What is claimed is:

1. The process of producing sesamol acetate which comprises reacting piperonal with approximately the stoichiometric amount of anhydrous peracetic acid in the presence of an acid catalyst for catalyzing the reaction between piperonal and peracetic acid to produce sesamol acetate, at a temperature of 50° to 70° C. and in the absence of a solvent for the peracetic acid.

2. In the process of producing sesamol acetate, the improvement which consists in maintaining a reaction mixture consisting of piperonal, anhydrous peracetic acid and a compound from the group consisting of p-toluenesulfonic and phosphoric acids at a temperature within the range of 50° to 70° C. until substantially all of the piperonal has been oxidized to sesamol acetate.

3. The improvement defined in claim 2 in which said reaction mixture is maintained at a temperature of 50° to 70° C. for from 2 to 4 hours, thereafter the reaction mixture is mixed with a non-polar solvent for the sesamol acetate in an amount to dissolve substantially all of the sesamol acetate and precipitate tarry by-products and the solution of sesamol acetate is separated from the precipitated tars.

4. The improvement defined in claim 3 in which the non-polar solvent is from the group consisting of benzene, toluene, xylene, ethylene dichloride and carbon tetrachloride.

References Cited in the file of this patent

Boeseken et al.: "Rec. Trav. Chim.," vol. 55, pp. 815–820 (1936).
Groggins: Unit Processes in Organic Synthesis, McGraw-Hill, New York, 1952, pp. 616–620.
Nachod et al.: Ion Exchange Technology, Academic Press, New York, p. 278, 1956.
Mariani et al.: Ricerca sci., vol. 20, 324–5 (1950); C.A., vol. 45, column 3222b, 1951.

UNITED STATES PATENT OFFICE
CERTIFICATE OF CORRECTION

Patent No. 2,885,407                                                              May 5, 1959

James E. Hardwicke et al

It is hereby certified that error appears in the printed specification of the above numbered patent requiring correction and that the said Letters Patent should read as corrected below.

Column 4, line 27, for "by-product" read -- by-products --; line 49, after "interval," insert -- to --; column 5, line 65, for "and", second occurrence, read -- was --.

Signed and sealed this 6th day of October 1959.

(SEAL)
Attest:

KARL H. AXLINE                                                   ROBERT C. WATSON
Attesting Officer                                               Commissioner of Patents